3,063,967
POLYMERS OF 2-p-DIOXANONE AND METHOD FOR MAKING SAME
Herman S. Schultz, Easton, Pa., assignor to General Aniline & Film Corporation, New York, N.Y., a corporation of Delaware
No Drawing. Filed Oct. 7, 1959, Ser. No. 844,847
16 Claims. (Cl. 260—78.3)

This invention relates to new and useful polymeric materials, and in particular to polymers derived from 2-p-dioxanone which are outstandingly useful as coatings, films, textile fibers, molding powders and the like, and to the methods for the preparation of such polymeric materials.

The compound 2-p-dioxanone which has the formula:

which is a cyclic ester or lactone which is old and well known but for which uses have been long wanting. The compound may be prepared by numerous methods among which cyclization of diethylene glycol is probably the most well known. One of the serious obstacles to the development of uses for dioxanone lies in the property of this compound to undergo polymerization, and often spontaneous polymerization to low molecular weight products which have not been deemed useful for any purpose. As a matter of fact, much effort has been expended in attempting to forestall this spontaneous polymerization by such techniques as ring substitution. All attempts to obtain useful polymers from dioxanone have been fruitless. Products having molecular weights of the order of 1200 to 1300 have been reported but such low molecular weight materials are worthless as film formers and precursers for fibers. Polymeizations employing various catalysts have been tried but none has achieved a product of a molecular weight more than about 2500, and again, such products are completely unsuitable as film formers, and especially for the manufacture of textile fibers. The thermal polymerization of the compound has failed to yield any product above a molecular weight of about 2000. Again, this is completely unsatisfactory.

From a careful review of the work of W. H. Carothers, especially as set out in his collected papers on high polymeric substances published in 1940 by the Interscience Publishers, Inc. of New York, one could hardly expect a six-member lactone to form a useful high molecular weight polymer product. Various methods have been proposed for the polymerization of seven- and eight-membered lactones wherein the reaction is made to go to successful polymer formation by the use of selected catalytic agents. None of such catalysts, however, has been successful in obtaining any useful polymeric material from dioxanone.

It is therefore an object of this invention to provide new and useful polymers derived from 2-p-dioxanone.

It is still another object of this invention to provide new and useful polymers of 2-p-dioxanone which yield satisfactory fiber diagrams in a stretched condition.

It is still another object of this invention to provide polymers of 2-p-dioxanone which exhibit the characteristic of molecular orientation.

It is still another object of this invention to provide processes for the preparation of polymers from 2-p-dioxanone which yield X-ray fiber diagrams in the stretched condition.

It is still another object of this invention to provide processes for the preparation of polydioxanone which polymer is characterized by being capable of being molecularly oriented.

It is still a further object of this invention to provide films, fibers and molding powders of poly-2-p-dioxanone of greatly increased molecular weight and methods for making same.

It is still another object of this invention to provide processes whereby 2-p-dioxanone may be polymerized to a high molecular weight product suitable for use in the manufacture of textile fibers.

Other objects will appear hereinafter as the description proceeds.

As pointed out above, all previous attempts to polymerize 2-p-dioxanone to form linear superpolymers suitable for the preparation of films and fibers have failed. The catalysts heretofore employed in lactone polymers have failed to yield any useful products of 2-p-dioxanone. Such catalysts include sulfuric acid, sodium hydride, boron trifluoride, benzoyl peroxide, powdered sodium hydroxide, powdered lithium hydroxide, phosphorous pentoxide, 85% phosphoric acid, 99% phosphoric acid, aluminum chloride, tri-isopropoxy aluminum, and methyl borate.

It has now been discovered that by the employment of a specific type of organo-aluminum compounds, polymers from 2-p-dioxanone are obtainable which polymers are capable of being oriented to yield, among other forms, textile fibers which exhibit the characteristic X-ray fiber diagram when in stretched condition. The organo-aluminum compounds which are herein contemplated are characterized by the following general formula:

$$[R]_n\text{—Al—}[R']_m$$

wherein R is an alkyl or aryl radical; $n$ is an integer from 1 to 3, inclusive; R′ may be hydrogen, halogen, hydroxy, alkoxy, aryloxy, and acyloxy; $m$ is 0, 1 or 2; and $n+m$ equal 3. The preferred organo-aluminum compounds are those wherein R′ is hydrogen, alkoxy, aryloxy, or any combination of these. Suitable compounds within the above generic formulas include the following:

Trimethyl aluminum
Triethyl aluminum
Diethyl aluminum hydride
Tributyl aluminum
Tri-isobutyl aluminum
Tripropyl aluminum
Triphenyl aluminum
Trihexyl aluminum
Tris-(2-ethyl-hexyl) aluminum
4-(ethoxybutyl)-diethyl aluminum
Ethoxy diethyl aluminum
Ethoxy dibutyl aluminum
Isobutoxy diisobutyl aluminum
Isobutoxy isobutyl aluminum hydride
Isobutoxy diethyl aluminum
Diphenyl aluminum hydride
Di-isobutyl aluminum hydride
Isobutyl aluminum dihydride In addition to the individual components, it is of course obvious that mixtures of the above catalysts may be employed with equal facility. The amount of catalyst to be employed should of course be sufficient to effect polymerization within a reasonable time. In practice it has been that as little as 0.001% by weight of catalyst based on the weight of the 2-p-dioxanone results in the polymer formation within several hours. The amount of catalyst necessary is also related to the purity of the 2-p-dioxanone, and consequently with the purest samples of monomer, less catalyst is necessary. The upper limit of catalyst is not critical but it is found that no useful purpose appears to be served by employing more than 5% based on the weight of the monomer. The preferred range of catalyst lies between about 0.01% and 1% by weight based on the weight of the monomer.

The polymerization of the 2-p-dioxanone may be carried out either in bulk or in a liquid suspending medium which may be a solvent for the dioxanone, or merely act as a suspending medium therefor. Suitable solvents for 2-p-dioxanone which may be used in the polymerization procedure include the following:

Benzene
Toluene
Xylene
Dioxane
Diethyl ether
Chloroform
Tetrahydrofurane
and the like It will be noted that dioxanone is soluble in a great variety of organic liquids and any of these is suitable for the polymerization procedure. Non-solvents for this compound include the aliphatic hydrocarbons such as n-heptane, the hexanes and the aliphatic petroleum ethers. Where a solvent is used, the concentration of dioxanone may be any selected concentration although it is preferred to employ solutions from about 25% to 70% concentration. The polymerization procedure in most instances initiates at room temperature with the aforementioned type of catalyst and proceeds usually as a slightly exothermic type of reaction. Much lower temperatures as well as more elevated temperatures may be used, however, without detracting from the utility of the polymerization procedure. Thus one may use temperatures as low as −20° C. at the low end and as high as 150° C. at the upper end. The preferred temperature range lies between about 10° C. and 80° C.

The following examples will serve to illustrate the present invention without being deemed limitative thereof, and in these examples parts by weight are intended unless otherwise indicated.

*Example 1*

31.6 cc. (40 g.) of 2-p-dioxanone which has been twice distilled under nitrogen and maintained under an anhydrous atmosphere in a substantially anaerobic condition is added to 30.0 cc. of benzene and to this solution there is then added 0.5 cc. of a 25% solution of triisobutyl aluminum in heptane. The resulting substantially homogeneous mixture is agitated at room temperature and after 1 hour and 50 minutes the contents have solidified to a white mass. After standing over night for about 15 hours, the contents are removed from the reaction vessel and are found to be resin-like in nature, very tough and with a milky white appearance. The product is ground up and placed in a vacuum chamber to effect removal of the benzene solvent. The substantially solvent free product is then employed in a Carver press to yield, at 130–135° C., tough, flexible films. These films have a tensile strength of 3362 p.s.i. A sample of the polymer is extruded into a film which, after being drawn to about 11 times its original length, is found to have a tensile of 12,607 p.s.i. Fibers of excellent characteristics are formed by extrusion. The drawn fibers exhibit a characteristic oriented X-ray fiber diagram.

*Example 2*

In Example 1 there is exemplified a polymerization in a solvent. In this example no solvent is used. In a 4 oz. bottle there is agitated at room temperature under nitrogen, a mixture of 31.6 cc. of 2-p-dioxanone in a highly purified state and 0.3 cc. of the same catalyst employed in Example 1. After 55 minutes the material has become very viscous and there is evidence of reaction by the evolution of a slight amount of heat, indicating an exothermic reaction (T.=about 45° C.). After 1 hour and 15 minutes, the contents of the bottle appear as a firm gel and after about 1½ hours the gel has turned into a white opaque solid. After standing over night, it was found that the bottle containing the contents had shattered and the product contained therein was extremely tough. Films prepared as in Example 1 are found to have a tensile strength of 5678 p.s.i. and drawn fibers prepared from this polymer product, a tensile strength of 17,992 p.s.i. (elongation 1134%). A capillary tube melting point determination gives a value of about 129° C. The drawn fibers of this example, as with those of Example 1, exhibit the characteristic fiber picture indicating a highly oriented crystalline molecular arrangement in the stretched polymer.

*Example 3*

The bulk polymerization technique of Example 2 is repeated employing 140 g. of dioxanone highly purified and 0.85 cc. of the same catalyst. After 1 hour the reactants are slightly warm, indicating that the reaction has begun. After an additional 50 minutes, the bottle becomes too hot to handle, and the contents have gelled by this time. Again, after standing over night, it is found that the bottle is shattered, which appears to indicate that the polymer contracts with sufficient force and adhesion to the bottle to break same. The melting point of the polymer product of this example, when taken in a manner similar to Example 2 is 110° C. Films are formed in a Carver press as in Example 1. The tensile strength thereof is 5107 p.s.i. The elastic modulus is $43 \times 10^3$ p.s.i. Fibers formed from a melt at 125° C. when cold drawn have a tensile strength of 14,715 p.s.i. The polymer is further tested for chemical resistance in the following solvents and found to be resistant thereto at room temperature:

Ethyl alcohol
Acetone
Ethyl acetate
Ethylene dichloride
Carbon tetrachloride
Toluene
n-Heptane
10% sodium chloride aqueous solution

*Example 4*

To 154 g. of purified n-heptane contained in a 1 liter resin flask there is added 87.0 g. of 2-p-dioxanone highly purified and 0.75 cc. of the same catalyst employed in the previous examples. The dioxanone is not soluble in the heptane but remains dispersed therethrough upon vigorous shaking. After 10 minutes, an additional 1.80 cc. of catalyst is added. After an additional 20 minutes, the flask is heated until the contents thereof have reached a temperature of 44° C. 30 minutes thereafter there are the first signs of reaction as the temperature of the contents rises somewhat from room temperature. The temperature is held at 35–37° C. for 20 minutes and at this time the suspended dioxanone particles appear to have increased in viscosity. 10 minutes thereafter the entire mass appears as a dispersion of solids in the liquid heptane phase and after an additional 25 minutes, the contents of the flask are completely filled with a solid mass in suspension. The solid mass is then removed from the supernatant heptane and desiccated in a vacuum to remove the last traces thereof. A film is formed again as in Example 1 and is found to have a tensile strength of 3324 p.s.i. The polymer has a melting point capillary method of 125° C. which is confirmed on a Mannheim block where the melting point is ascertained to be 120–125° C. Fibers drawn to an elongation of 778% are found to have a tensile strength of about 8000 p.s.i. These fibers exhibit the characteristic X-ray fiber picture of a highly oriented crystalline chemical structure.

*Example 5*

A bulk polymerization is conducted in a 4 oz. bottle.

containing 77.5 g. of highly purified 2-p-dioxanone and 0.6 cc. catalyst of Example 1. A slight exothermic reaction begins almost immediately. After 15 minutes, a gel begins to form. 20 minutes later the gel is firm. After 75 minutes a white solid appears and after 2 hours the bottle collapses and a milky white very tough solid is removed. The resin-like material can be sawed and planed with great ease. The films are pressed as in Example 1 and are found to have a tensile strength of 3371 p.s.i. Fibers are extruded from a melt at 125° C. and when drawn to about 8× are found to have a tensile strength of 11,447 p.s.i. A compression test on a solid block of polymer gives a value of $10.6 \times 10^3$ pounds per square inch, and at this point there is no rupture of the polymer but due to deformation thereof, no further reading is obtainable. At this point, the compressive strain is 31.7% and the product is also found to have an elastic modulus of $1 \times 10^5$ p.s.i.

Other variations in and modifications of the described processes which will be obvious to those skilled in the art can be made in this invention without departing from the scope or spirit thereof.

I claim:

1. Homopoly 2-p-dioxanone which is drawable and flexible yielding an X-ray fiber diagram in stretched condition.

2. Films of homopoly-2-p-dioxanone which is drawable and flexible yielding an X-ray fiber diagram in stretched condition.

3. Fibers of homopoly-2-p-dioxanone which is drawable and flexible yielding an X-ray fiber diagram in stretched condition.

4. Homopoly-2-p-dioxanone which is drawable and flexible molding powder yielding an X-ray fiber diagram in stretched condition.

5. The method which comprises polymerizing 2-p-dioxanone with a polymerization catalyst having the formula:

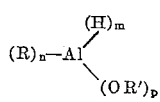

wherein $n$ equals 1 to 3, $m$ equals 0 to 2, $p$ equals 0 to 2, and the sum of $n$, $m$ and $p$ is 3, and R and R' are radicals selected from the group consisting of alkyl and aryl.

6. The method which comprises polymerizing 2-p-dioxanone with an aluminum alkyl catalyst.

7. The method which comprises polymerizing 2-p-dioxanone with a dialkyl aluminum hydride catalyst.

8. The method which comprises polymerizing 2-p-dioxanone with a monoalkyl, monoalkoxy aluminum hydride catalyst.

9. The method which comprises polymerizing 2-p-dioxanone with a dialkyl, monoalkoxy aluminum catalyst.

10. The method which comprises polymerizing 2-p-dioxanone with a trialkyl aluminum catalyst.

11. The method which comprises polymerizing 2-p-dioxanone at a temperature of from about −20° C. to about 150° C. with from about 0.001% to about 5% by weight based on the weight of the 2-p-dioxanone of an organo aluminum catalyst containing at least one linkage selected from the group consisting of aluminum-alkyl and aluminum-aryl linkages.

12. The method which comprises polymerizing 2-p-dioxanone at a temperature of from about −20° C. to about 150° with from about 0.001% to about 5% by weight based on the weight of the 2-p-dioxanone of a polymerization catalyst having the formula:

$$[R]_n Al - [R']_m$$

wherein R is a radical selected from the group consisting of alkyl and aryl; $n$ equals 1 to 3; R' is a radical selected from the group consisting of hydrogen, halogen, hydroxy, alkoxy, aryloxy and acyloxy; and $m$ equals 0 to 2, and $n$ plus $m$ equals 3.

13. The method which comprises polymerizing 2-p-dioxanone with triisobutyl aluminum catalyst.

14. The method which comprises polymerizing 2-p-dioxanone at a temperature of from about −20° C. to about 150° C. with from about 0.001% to about 5% by weight based on the weight of the 2-p-dioxanone of a trialkyl aluminum catalyst.

15. The method which comprises polymerizing 2-p-dioxanone at a temperature of from about −20° C to about 150° C. with from about 0.001% to about 5% by weight based on the weight of the 2-p-dioxanone of triisobutyl aluminum.

16. The method which comprises polymerizing 2-p-dioxanone at a temperature from about 10° C. to about 80° C. with from 0.01% to about 1% by weight based on the weight of the 2-p-dioxanone of triisobutyl aluminum.

References Cited in the file of this patent

FOREIGN PATENTS 869,867    Germany _____ Mar. 9, 1955

OTHER REFERENCES

Leimu et al.: Chem. Abstracts, vol. 38, cols. 5717–5718 (1944).

Salmi: Chem. Abstracts, vol. 40, pages 6491–2, 1946.